Feb. 22, 1955 A. B. CRAMPTON 2,702,592
JET AIRCRAFT FUEL SYSTEM
Filed Jan. 18, 1952
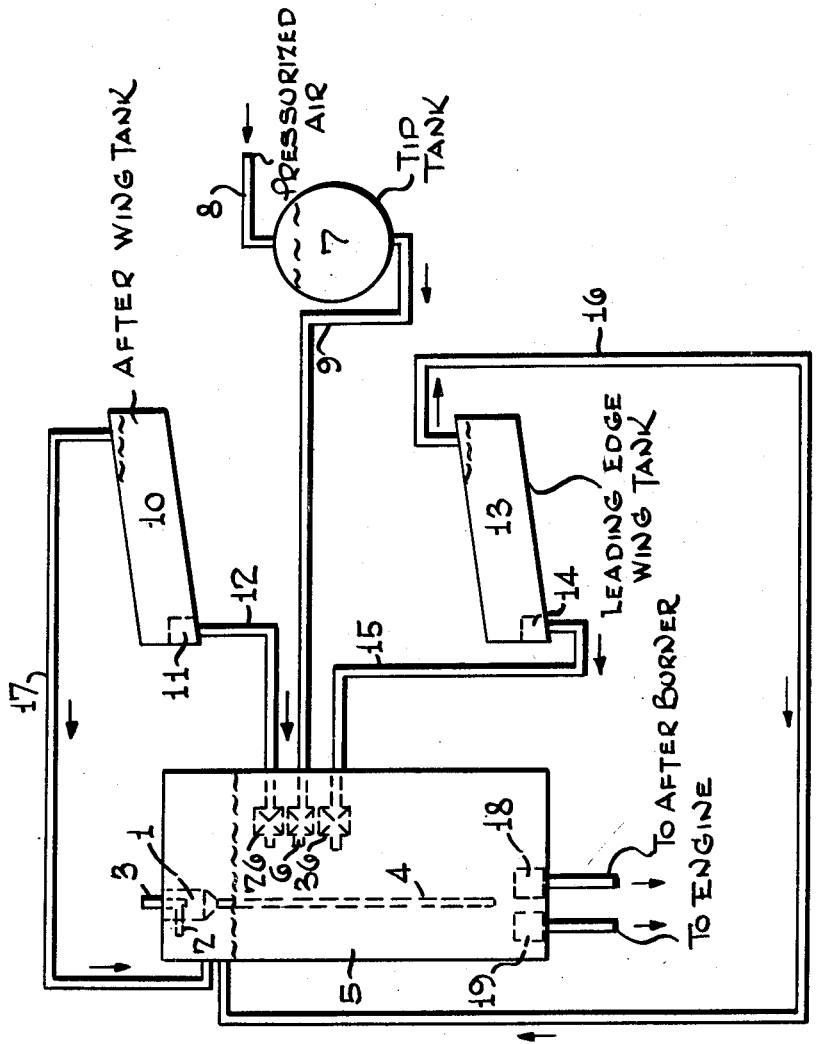
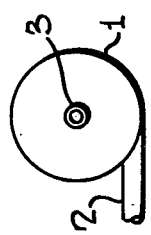
Alton B. Crampton Inventor
By W. O. T. Heilman Attorney United States Patent Office 2,702,592
Patented Feb. 22, 1955

2,702,592

JET AIRCRAFT FUEL SYSTEM

Alton B. Crampton, Westfield, N. J., assignor to Standard Oil Development Company, a corporation of Delaware Application January 18, 1952, Serial No. 267,095

2 Claims. (Cl. 158—36.5)

This invention relates to an improvement in the fuel systems employed in jet-propelled aircraft. More specifically, it concerns an improved venting apparatus for use in a jet aircraft fuel system which reduces the losses of fuel occasioned by rapid ascents to high altitudes. A particular object of this invention is to extend the supply of jet fuels by permitting the use of relatively volatile constituents in these fuels without thereby incurring high fuel losses.

One of the most outstanding characteristics of jet aircraft is their ability to reach very high altitudes in a matter of minutes following take-off. In the case of military planes, rapid rates of climb are very common. This ability to reach high altitudes rapidly has introduced fuel problems caused by the sudden reduction in atmospheric pressure accompanying such rapid rates of climb.

It is a well known fact that the pressure of the atmosphere at high altitudes above the earth is markedly lower than that existing at sea level. As a result, a fuel which may not be considered to be very volatile at sea level or moderate altitudes may become extremely volatile at high altitudes. Essentially, the reduced atmospheric pressure at high altitudes permits the more volatile constituents of a jet fuel to boil away. None of the constituents which are truly vaporized at high altitudes can be recovered without the use of suitable cooling apparatus such as coolers or condensers. It has been observed, however, that a great amount of unvaporized fuel is also lost as a result of physical carry-over or entrainment with the fuel constituents that are converted to the vapor state. While very little can feasibly be done to prevent the loss of fuel constituents that exist as vapors at high altitudes, it is an object of this invention to reduce the loss of the liquid components entrained in the vapor.

A typical jet aircraft fuel system consists of (1) storage tanks located in each wing structure and suspended from each wing tip, (2) a centrally located fuselage tank connected with the storage tanks, and (3) associated pumps and transfer and vent lines. The tanks located in the wing are conventionally known as wing tanks while the wing-tip tanks are usually called tip tanks.

In general, fuel flows from the tip tanks and wing tanks to the central fuselage tank from which it is pumped either to the engine or to the after burner. An arrangement of level control valves associated with the fuselage tank determines which of the storage tanks will supply fuel to the fuselage tank at any given time. These valves are actuated automatically by the level of fuel in the fuselage tank. They may be operated either automatically or manually.

Fuel is generally transferred from the tip tanks to the fuselage tank by means of air pressure. Sump-type centrifugal pumps with attached de-aerating devices transfer fuel from the wing tanks to the fuselage tank. Vent lines run from the uppermost parts of the wing tanks to the top of the fuselage tank to permit fuel to be transferred between these tanks without difficulty. The fuselage tank in turn is vented to the atmosphere to allow vapors and air present in this tank to escape.

Two additional sump-type centrifugal pumps are located in the bottom of the fuselage tank. One of these pumps continuously delivers fuel to the engine; the other pump delivers fuel to the after burner. The latter pump is employed only when rapid accelerations in plane speed are desired.

When a jet aircraft equipped with a typical fuel system, such as the one described above, takes off and gains altitude rapidly, the atmospheric pressure exerted on the fuel drops at a correspondingly rapid rate. As a result, the more volatile constituents of the fuel boil or vaporize from the fuel and rush out the vents in the wing tanks and the fuselage tank. The wing tanks are vented to the fuselage tank which in turn is vented overboard. The amount of fuel lost due to such vaporization is governed by such fuel properties as (1) the temperature of the fuel in the tanks at the time of take-off; (2) the volatility of the fuel; and (3) the boiling point distribution curve of the fuel. The rate of climb of the aircraft and the altitude to which it ascends also have a direct effect on the amount of fuel that will be lost.

An additional and considerable amount of fuel is also lost by physical carry-over of liquid constituents with the vaporized portions as described earlier. Both the vaporized constituents and the entrained liquid components of the fuel are lost through the vent in the fuselage tank. In some instances, up to 25% of a fuel may be lost due to vaporization while additional amounts (40 to 60% of the fuel) may be lost by physical carry-over. Percentage losses such as those just given can be expected when taking a plane to 50,000 feet rapidly with a 5 to 7 pound Reid vapor pressure fuel which has a temperature of 100° F. at time of take-off.

There appears to be no practicable method for reducing the amount of fuel lost by vaporization since the portion vaporized must be cooled and condensed to be recovered. Use of the present invention, however, will permit recovery of the normally liquid constituents that are now lost by physical entrainment with the vaporized portion.

A number of solutions to the fuel loss problem described above have already been advanced, but none of them has been sufficiently free of collateral disadvantages to warrant adoption. For example, it has been advocated that pressurized fuel tanks be employed in jet planes. Such a proposal not only would impose a weight penalty but also would cause a loss of self-sealing properties in the tanks and thus is very undesirable.

It has also been suggested that the volatility of jet fuel be reduced to a point such that it will not vaporize under the atmospheric pressures existing at high altitudes. Some steps have already been taken in this direction, as is illustrated in the following table. In this table, the characteristic inspections of the three jet aircraft fuels now in general use are given:

Comparison of JP–1, JP–3, and JP–4 turbo-fuel specifications

|  |  | MIL-F-5616 | MIL-F-5624A | |
|---|---|---|---|---|
|  |  | JP-1 | JP-3 | JP-4 |
| Reid Vapor Pressure | Lim | | 5-7 | 2-3 |
| ASTM Distillation: | | | | |
| 10% Evap. at °F | Max | 410 | | 250 |
| 90% Evap. at °F | Lim | <490 | >400 | |
| Final Boiling Pt., °F | Max | 572 | 600 | 550 |
| Distillation Loss, Vol. Percent | Max | 1.5 | 1.5 | 1.5 |
| Net Heat, B. t. u./lb | Min | | 18,400 | 18,400 |
| Gravity, °API | Lim | >35 | 45-63 | 40-58 |
| Freezing Pt., °F | Min | -76 | -76 | -76 |

It will be noted that the JP–1 fuel is the most desirable one to employ when considering only the vapor pressures of the three fuels. It is apparent that the losses due to vaporization with this fuel would be the lowest of the three. However, this type of fuel is and will be in very limited supply from petroleum refineries. To obtain a fuel having the specifications characteristic of the JP–1 type, it is necessary to selectively withdraw what amounts to a very small proportion of most petroleum crude oils. Extensive production of a JP–1 type fuel wuld be almost impossible.

From a consideration of supply alone, it is further apparent that the JP–3 type fuel is the most desirable of the three described above. Its higher vapor pressure and wider boiling range permit refiners to include many constituents of crude oil not permitted in the JP–1 type.

60% of some crude oils are capable of being converted directly to jet fuel of the JP–3 type. This fuel type, however, begins to boil at about 15,000 feet with the result that high vaporization and entrainment losses are experienced.

The JP–4 fuel has been developed as a compromise solution to the supply and vapor loss problems, but the solution appears to be only a temporary one since this fuel begins to boil at altitudes of about 30,000 feet. With higher ceilings than this now being contemplated, this fuel will also be subjected to extensive losses due to vaporization, froth formation and physical carry-over.

The present invention is not concerned with attempts to solve the fuel loss problems by any consideration of fuel volatility. Rather, this invention permits the use of volatile fuels such as the widely available JP–3 type by providing a means for recovering the unvaporized portions of these fuels now being lost because of foam formation and physical carry-over.

The objects of this invention are accomplished by incorporating a vapor-liquid separating means in a jet aircraft fuel system at the point where it vents to the atmosphere. The liquid portion of a fuel that is normally entrained and lost with the portion vaporizing because of reduced atmospheric pressure will thereby be recovered.

A particularly satisfactory style of vapor-liquid separator to employ is the centrifugal or cyclone type. With this type, the venting vapors and entrained liquids are subjected to centrifugal forces that cause the liquids to be physically separated from the vapors. The vapors continue out through a vent, while the liquids are returned to the main fuel body. In this way, only the truly vaporized fractions of a fuel are lost.

For further understanding of the invention, reference may be had to the accompanying drawing in which:

Figure 1 is a schematic flow plan of one-half of a typical jet aircraft fuel system, indicating the utilization of a cyclone vapor-liquid separator as described in this invention; and Figure 2 is a top view of a cyclone separator of a type that is particularly effective for the purposes of this invention.

Referring to Fig. 1, a set of the various fuel storage tanks conventionally employed in a jet aircraft are shown. These are the tip tank 7, the aft wing tank 10, and the leading edge (wing) tank 13. Only one of each of these tanks is illustrated; in actual practice each wing is equipped with a set of these tanks. Further, the aft and leading edge wing tanks may actually consist of a number of smaller tanks.

Fuel flows from the storage tanks to a centrally-located fuselage tank 5. Level control valves 6 actuated by the fuel level in this tank cause fuel to flow from one or more of the storage tanks. It will be noted that there is generally but one fuselage tank in a fuel system.

Pressurized air (about 15 p. s. i. g.) in line 8 forces fuel from the tip tank to the fuselage tank, while centrifugal sump-type pumps 11 and 14 transfer fuel from the wing tanks to the fuselage tank. Vent lines 16 and 17 keep the wing tanks and the fuselage tank at the same pressure, thereby permitting trouble-free transfer of the fuel.

Pump 19 supplies fuel from the fuselage tank to the fuel injection system while pump 18 feeds fuel to the after-burner when so desired.

In conventional fuel systems of the type just described a simple vent pipe is located in the top of the fuselage tank. In theory, only fuel vapors are intended to escape through this vent. In practice, however, as has been described earlier, large amounts of actual liquid material are also lost here due to foaming and entrainment with the vapor.

The present invention which consists of a vapor-liquid separator prevents the loss of any liquid fuel out the vent in the manner described earlier. In Figure 1 a particularly desirable type of such a separator in the form of a cyclone separator 1 is illustrated. A top view is shown in Fig. 2.

Fuel vapor and liquid enter through inlet conduit 2. Centrifugal forces are then brought to play on the incoming stream by utilizing the velocity of the stream. As the stream enters the cylindrical body of the separator, the resulting continuous change in the direction of flow causes the liquid portions of the fuel to be separated from the vapor portions. The vapor portions eventually exit through a vent pipe 3 while the liquid portions flow by gravity through a dip pipe 4 to a point within the fuselage tank.

In securing optimum efficiency, the dip leg of the cyclone must extend below the level of liquid in the tank and preferably to a point near the tank bottom. It is further required that the inlet of the vent pipe 3 be located below the point at which the inlet pipe 2 enters the cyclone proper.

Variations of simple cyclone separators such as multiclones may be employed in the apparatus described in this invention. Cyclone separators in general are especially attractive for use here, since they are compact, lightweight, and have low-pressure drop characteristics. It is preferred that the separator be located within the fuselage tank to eliminate any projection beyond the contour of the fuselage.

It will also be noted that the position of the separator in the vapor section of the central fuselage tank enables it to effectually serve as a separator for all of the storage tanks as well as the fuselage tank.

Jet type fuel of any satisfactory composition may be employed in this fuel system. Ignition promoters and other additives may be employed in the fuel.

It is notable that the problem of liquid entrainment losses described above is not encountered with aviation gasoline fuel systems, despite the fact that JP–3 fuel has about the same Reid vapor pressure as aviation gasoline. Vapor losses are experienced with the latter fuel, but in general they are somewhat less in degree. Liquid carry-over in aviation gasoline fuel systems used to date is virtually non-existent.

It is felt that existence of the liquid carry-over problem in the case of jet fuels is due to the presence of viscous high boiling fractions which are not permitted in gasolines. For example, jet fuels have final boiling point specifications of 550–600° F., while aviation gasoline generally has an end point of about 330° F.

What is claimed is:

1. In a fuel system for a jet propelled aircraft including a plurality of storage tanks, the improvement which comprises a central closed fuel tank adapted to receive fuel from said storage tanks and to transmit the fuel to the jet engine, means for maintaining a liquid level within said tank, a centrifugal vapor liquid type separator positioned within said tank and in the vapor space above said liquid level, first conduit means to convey fuel vapors and entrained liquid fuel within said separator from said vapor space, second conduit means to vent the separated vapors to the atmosphere and third conduit means to return the separated entrained liquid to the fuel tank.

2. Apparatus as defined in claim 1 in which the centrifugal separator is a cyclone separator.

References Cited in the file of this patent

UNITED STATES PATENTS

| Number | Name | Date |
|---|---|---|
| 1,032,170 | Wolff | July 9, 1912 |
| 1,516,358 | Thomas | Nov. 18, 1924 |
| 1,518,152 | Kingdon | Dec. 9, 1924 |
| 1,841,691 | Wilson | Jan. 19, 1932 |
| 2,191,671 | Kuhner | Feb. 27, 1940 |
| 2,214,658 | Browning | Sept. 10, 1940 |
| 2,247,566 | Walton | July 1, 1941 |
| 2,262,860 | Roe | Nov. 18, 1941 |